(12) United States Patent
Okuda et al.

(10) Patent No.: US 11,458,720 B2
(45) Date of Patent: Oct. 4, 2022

(54) COMPOSITE MATERIAL BONDING APPARATUS AND COMPOSITE MATERIAL BONDING METHOD

(71) Applicant: MITSUBISHI HEAVY INDUSTRIES, LTD., Tokyo (JP)

(72) Inventors: Akihisa Okuda, Tokyo (JP); Hiromichi Akiyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/388,062

(22) Filed: Jul. 29, 2021

(65) Prior Publication Data
US 2022/0203667 A1    Jun. 30, 2022

(30) Foreign Application Priority Data
Dec. 28, 2020 (JP) .............................. JP2020-219106

(51) Int. Cl.
*B32B 41/00* (2006.01)
*B32B 37/18* (2006.01)
*B32B 37/06* (2006.01)

(52) U.S. Cl.
CPC .............. *B32B 41/00* (2013.01); *B32B 37/06* (2013.01); *B32B 37/182* (2013.01)

(58) Field of Classification Search
CPC ........ B32B 41/00; B32B 37/06; B32B 37/182
USPC .................... 156/60, 64, 350, 351, 378, 379
See application file for complete search history.

(56) References Cited

U.S. PATENT DOCUMENTS

2019/0039338 A1* 2/2019 Linde ..................... B29C 73/26

FOREIGN PATENT DOCUMENTS

JP           3859321 B    12/2006

* cited by examiner

*Primary Examiner* — Michael N Orlando
*Assistant Examiner* — Joshel Rivera
(74) *Attorney, Agent, or Firm* — Kanesaka Berner and Partners LLP (57) ABSTRACT

The embodiment includes: a planar graphite heater; a clamp device that moves the graphite heater, which is arranged between a first bonding surface W1a of a first composite material member and a second bonding surface of a second composite material member facing the first bonding surface, in a traveling direction with the graphite heater being in contact with the first bonding surface and the second bonding surface; and a control unit that controls the graphite heater to heat the first bonding surface and the second bonding surface while the graphite heater is in contact with the first bonding surface and the second bonding surface.

12 Claims, 12 Drawing Sheets

COMPOSITE MATERIAL BONDING APPARATUS AND COMPOSITE MATERIAL BONDING METHOD

CROSS-REFERENCE TO RELATED APPLICATIONS

This Application claims priority to Japanese Patent Application No. 2020-219106 filed Dec. 28, 2020, the contents of which are incorporated herein by reference in its entirety.

TECHNICAL FIELD

The present disclosure relates to a composite material bonding apparatus and a composite material bonding method for bonding composite material members to each other that contain fibers and resin.

BACKGROUND ART

As structural members for airplanes or the like, composite material members containing fibers and thermoplastic resin are used. For bonding a plurality of composite material members to each other, a bonding method of attaching and bonding the composite material members to each other after heating and melting their bonding surfaces is known (Patent Literature (PLT) 1). PLT 1 discloses that bonding surfaces of composite material members are melted by using an infrared heater provided in a heating furnace, the composite material members are moved to a pressure bonding molding device, and the bonding surfaces are then attached and bonded to each other.

CITATION LIST

Patent Literature

{PTL 1}
Japanese Patent No. 3859321

SUMMARY OF INVENTION

Technical Problem

However, since the bonding method disclosed in PLT 1 requires a step of transporting the composite material members to the pressure bonding molding device after melting, there are problems of a longer cycle time and a decrease in temperature during the transportation. Further, since bonding surfaces are heated by using an infrared heater, the rate of temperature rise is limited, and it is difficult to further shorten the cycle time.

Further, when bonding a wide area, there is a problem of need of a large infrared heater that can heat the wide area at once and a large device that can perform pressure bonding on the wide area at once.

The present disclosure has been made in view of such circumstances and intends to provide a composite material bonding apparatus and a composite material bonding method that can shorten the cycle time when bonding composite material members to each other.

The present disclosure intends to reduce the size of a heating device and a pressure bonding molding device as small as possible.

Solution to Problem

A composite material bonding apparatus according to one aspect of the present disclosure includes: a planar sheet heater; a sheet heater motion device that moves the sheet heater, which is arranged between a first bonding surface of a first composite material member and a second bonding surface of a second composite material member facing the first bonding surface, in a first direction with the sheet heater being in contact with the first bonding surface and the second bonding surface; and a control unit that controls the sheet heater to heat the first bonding surface and the second bonding surface while the sheet heater is in contact with the first bonding surface and the second bonding surface.

A composite material bonding method according to one aspect of the present disclosure is a composite material bonding method using a planar sheet heater and a sheet heater motion device that moves the sheet heater, which is arranged between a first bonding surface of a first composite material member and a second bonding surface of a second composite material member facing the first bonding surface, in a first direction with the sheet heater being in contact with the first bonding surface and the second bonding surface, and the composite material bonding method includes: causing the sheet heater to heat the first bonding surface and the second bonding surface while the sheet heater is in contact with the first bonding surface and the second bonding surface.

Advantageous Effects of Invention

The cycle time when composite material members are bonded to each other can be shortened.

The size of a heating device and a pressure bonding molding device can be reduced as small as possible.

DESCRIPTION OF EMBODIMENTS

One embodiment according to the present disclosure will be described below with reference to the drawings.

Figure 1:
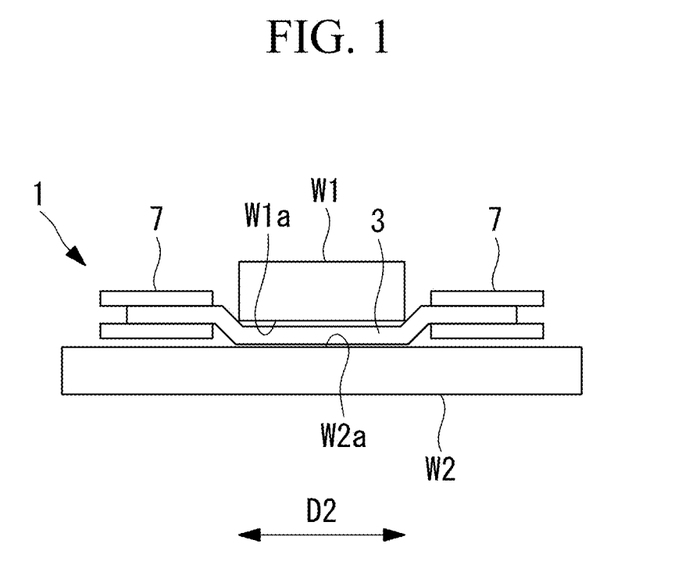
FIG. 1 is a vertical sectional view illustrating a composite material bonding apparatus according to one embodiment of the present disclosure and illustrating a main part of the composite material bonding apparatus during bonding of composite material members.
Figure 2:
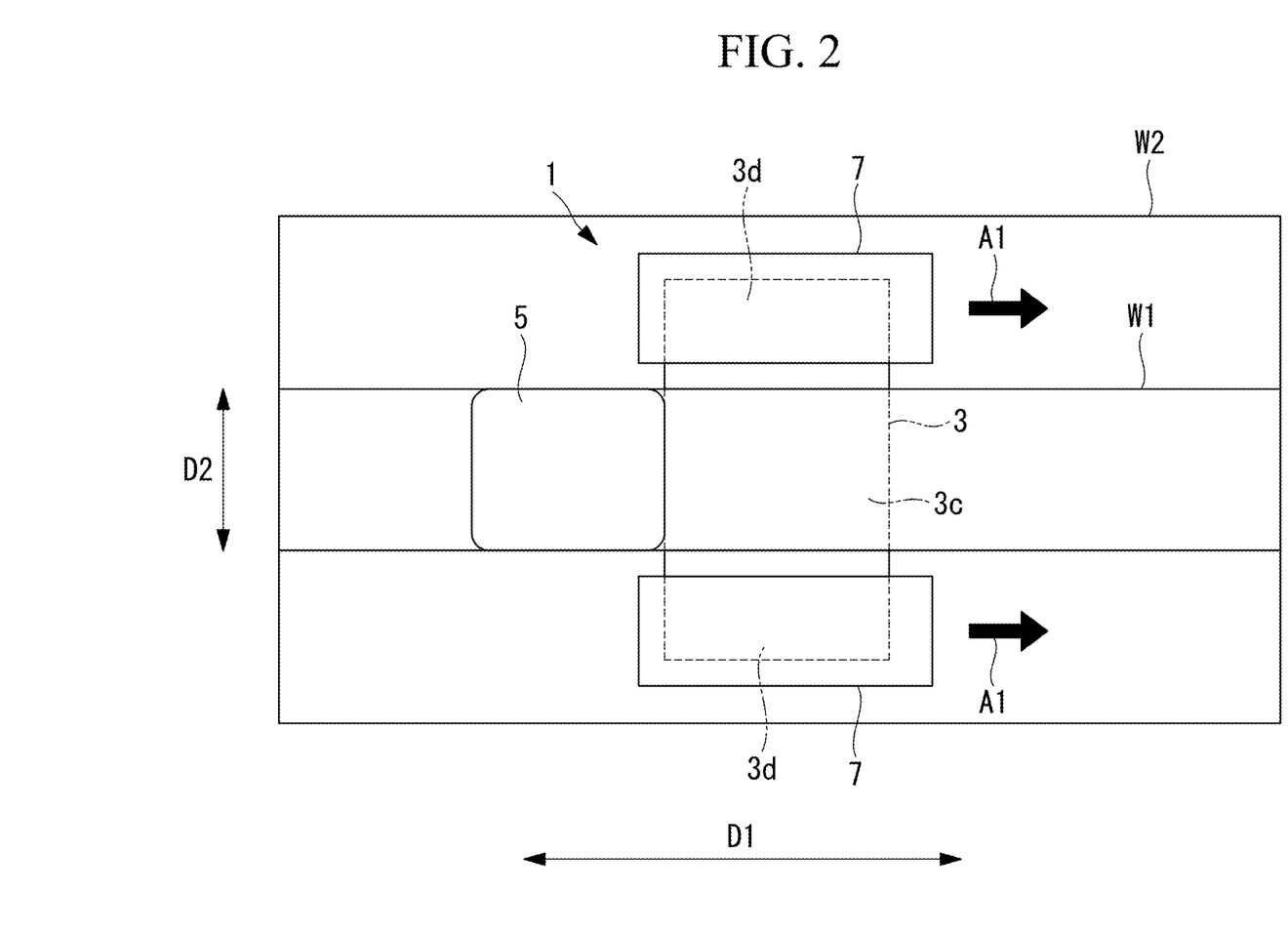
FIG. 2 is a plan view of a composite material bonding apparatus during bonding of composite material members.

FIG. 1 and FIG. 2 illustrate a general configuration of a composite material bonding apparatus 1 according to the present embodiment. FIG. 1 illustrates a vertical sectional view of a main part of the composite material bonding apparatus 1 during bonding of composite material members W1 and W2. FIG. 2 illustrates a plan view of the composite material bonding apparatus 1 during bonding of the composite material members W1 and W2. The composite material bonding apparatus 1 is used to bond the first composite material member W1 and the second composite material member W2.

The composite material members W1 and W2 are made of a composite material containing a resin and fibers such as carbon fibers. The composite material members W1 and W2 can be used as a structural member for an airplane, a ship, a vehicle, or the like, for example. The composite material members W1 and W2 have already been shaped and solidified.

A thermoplastic resin is preferably used for the composite material members W1 and W2. The composite material used for the composite material members W1 and W2 may be, for example, a carbon fiber reinforced plastic (CFRP), a glass fiber reinforced plastic (GFRP), an aramid fiber reinforced plastic (AFRP), or the like.

As illustrated in FIG. 2, the first composite material member W1 and the second composite material member W2 each are a long plate material extending in the longitudinal direction D1. As illustrated in FIG. 1, the first composite material member W1 has a shorter width dimension than the second composite material member W2. A first bonding surface W1a that is the under surface of the first composite material member W1 is bonded to a second bonding surface W2a that is the upper surface of the second composite material member W2.

Each shape of the first composite material member W1 and the second composite material member W2 illustrated in FIG. 1 and FIG. 2 may be a shape having an L-shape cross section or a U-shape cross section. The present disclosure is not limited to the shape illustrated in FIG. 1 and FIG. 2.

The composite material bonding apparatus 1 has a graphite heater (sheet heater) 3, a pressure cooling plate (see FIG. 2) 5 that cools and presses the composite material members W1 and W2, and clamp devices (holding unit) 7 that hold the graphite heater 3.

Figure 3:
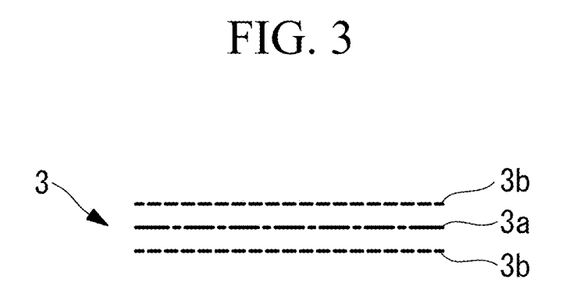
FIG. 3 is a vertical sectional view illustrating a layer configuration of a graphite heater.

As illustrated in FIG. 3, the graphite heater 3 is structured such that a front surface and a back surface of a heat generating portion 3a made of graphite are interposed between insulating layers 3b and integrated. The graphite heater 3 has a thickness of 0.2 mm or greater and 0.5 mm or less, for example, at the main part of the graphite heater 3. Although not illustrated, however, a frame member, a rigid layer, or the like may be provided as appropriate in order to maintain a planar shape of the graphite heater 3.

The heat generating portion 3a of the graphite heater 3 is made of graphite. For example, the graphite can be obtained by sintering a polyimide film. With the use of graphite for the heat generating portion 3a, a short heating time and a high attainable temperature can be achieved. For example, 1300° C. can be reached in a heating time of about 0.2 seconds.

The insulating layer 3b is made of a material having electrical insulation, and, for example, a heat-resistant resin, preferably a polyimide film is used. A heat-resistant glass having heat resistance around 1000° C. may be used.

Figure 4:
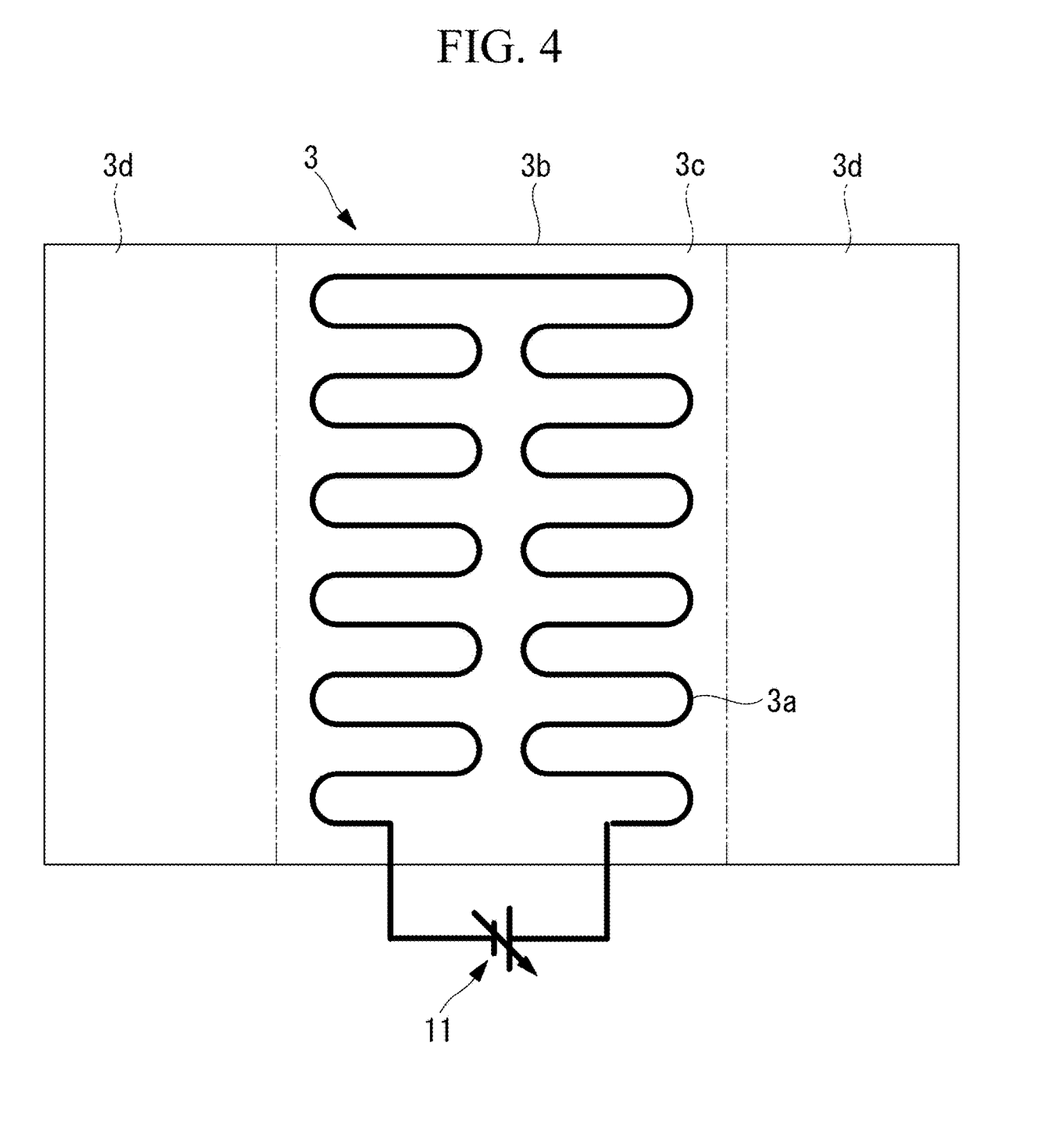
FIG. 4 is a plan view schematically illustrating a graphite heater.

As illustrated in FIG. 4, the graphite heater 3 is planar and is provided with a heat generating region 3c, which is provided with the heat generating portion 3a, and extension regions 3d, which are provided on both sides of the heat generating region 3c and do not generate heat. The heat generating portion 3a is arranged such that a linear portion is meandered and turned back. Both the ends of the heat generating portion 3a are connected to a DC power supply 11 whose output current and/or voltage is variable. The DC power supply 11 is controlled by a control unit (not illustrated).

The heat generating region 3c is located at the center of the graphite heater 3 and has a width dimension that is the same as or larger than the dimension of the width direction D2 (see FIG. 2) of the first bonding surface W1a or the second bonding surface W2a. This enables even and short-time heating of both the bonding surfaces W1a and W2a.

The extension regions 3d are provided on both side parts of the graphite heater 3, respectively, and are not provided with the heat generating portion 3a. That is, each extension region 3d is a non-heat generating region that does not generate heat. When the graphite heater 3 is installed between the bonding surfaces W1a and W2a as illustrated in FIG. 1 and FIG. 2, the extension regions 3d protrude out of both sides of the first composite material member W1.

The extension regions 3d are held by the clamp devices 7 as illustrated in FIG. 1 and FIG. 2. Each clamp device 7 holds the extension region 3d by gripping the upper surface and the under surface in the plate thickness direction of the extension region 3d. The clamp device 7 is operated in accordance with an instruction from the control unit and connected to an actuator (not illustrated). The graphite heater 3 is moved to the traveling direction (first direction) A1 illustrated in FIG. 2 by the clamp device 7. At this time, the clamp device 7 applies force outwardly in the width direction so that tension is applied in the width direction of the graphite heater 3.

The extension region 3d may be provided with a reinforced portion (both-side reinforced portion) having a higher strength than the heat generating region 3c that is another region of the graphite heater 3. Specifically, glass fibers having low electric conductivity may be interposed between the insulating layers 3b (see FIG. 3) so as to have a higher strength than polyimide forming the insulating layer 3b.

Figure 5:
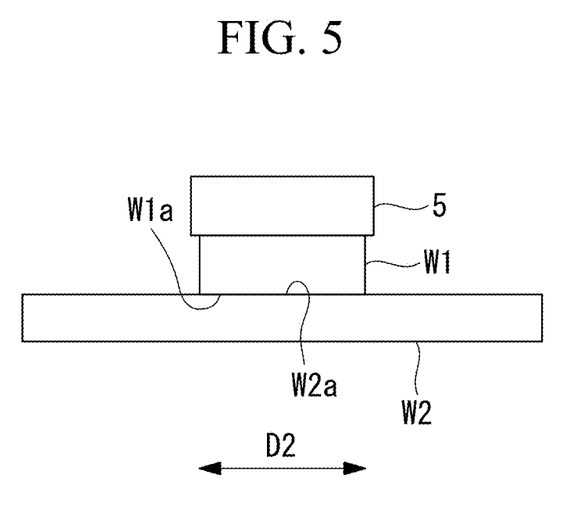
FIG. 5 is a vertical sectional view illustrating a state of pressing performed by a pressure cooling plate.

As illustrated in FIG. 2, the pressure cooling plate 5 is located behind the graphite heater 3 in the traveling direction A1. The pressure cooling plate 5 moves in the traveling direction A1 in synchronization with the graphite heater 3 in accordance with an instruction from the control unit. As illustrated in FIG. 5, the pressure cooling plate 5 applies pressure force so as to push the first composite material member W1 against and in surface-contact with the second composite material member W2 from above the first composite material member W1. During being in contact with the upper surface of the first composite material member W1, the pressure cooling plate 5 absorbs heat from the first composite material member W1 and thereby cools the first composite material member W1 and thus the bonding surfaces W1a and W2a. The pressure cooling plate 5 is made of a metal, for example, and configured to absorb heat from the first composite material member W1 by the heat capacitance of the pressure cooling plate 5. Note that a cooling device that performs forced cooling may be provided to the pressure cooling plate 5 by providing a Peltier element or a cooling water flow path.

The control unit is formed of a central processing unit (CPU), a random access memory (RAM), a read only memory (ROM), a computer readable storage medium, and the like, for example. Further, a series of processes to implement various functions are stored in the storage medium or the like in a form of a program, for example, and various functions are implemented when the CPU reads such a program to the RAM or the like and performs processing of information or operational processing. Note that a form in which a program is installed in advance in a ROM or another storage medium, a form in which a program is provided in a state of being stored in a computer readable storage medium, a form in which a program is delivered via a wired or wireless communication scheme, or the like may be applied to the program. The computer readable storage medium may be a magnetic disk, a magneto-optical disk, a CD-ROM, a DVD-ROM, a semiconductor memory, or the like.

Next, the operation of the composite material bonding apparatus 1 described above will be described.

Figure 6:
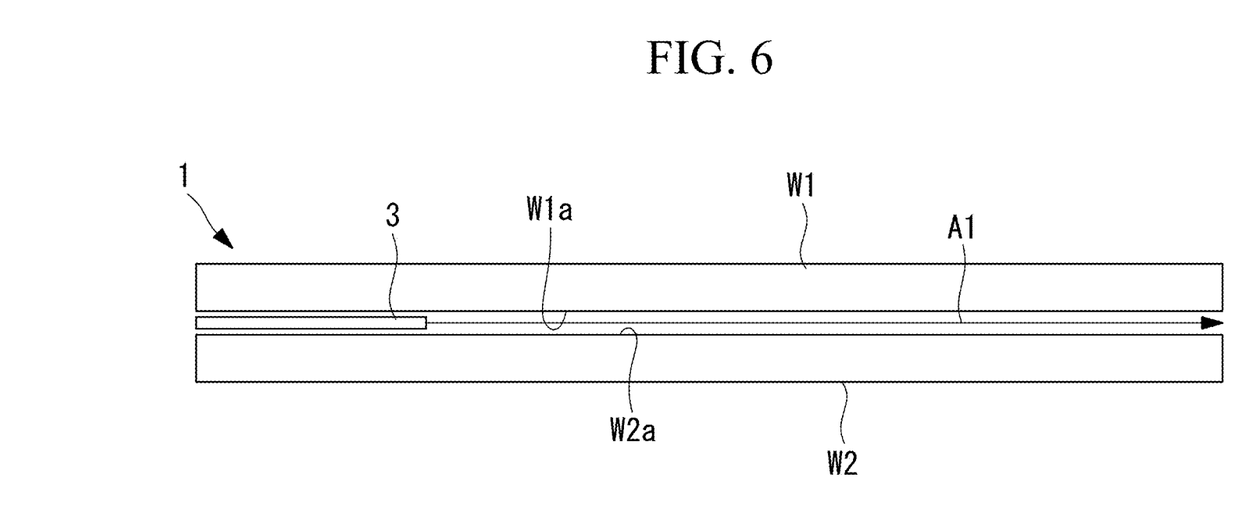
FIG. 6 is a side view illustrating a state where a graphite heater has been installed at an initial position.

First, as illustrated in FIG. 6, the graphite heater 3 is arranged between the first composite material member W1 and the second composite material member W2 that have not yet been bonded. At this time, the graphite heater 3 is in contact with the first bonding surface W1a and the second bonding surface W2a. Both the side parts of the graphite heater 3 are held by the clamp devices 7, as illustrated in FIG. 2.

The heat generating portion 3a of the graphite heater 3 then generates heat in accordance with an instruction from the control unit, and the first bonding surface W1a and the second bonding surface W2a are melted. While such a melting state is being achieved, the graphite heater 3 is moved in the traveling direction A1 continuously at a predetermined speed by the clamp devices 7. At this time, the clamp devices 7 apply tension force to the graphite heater 3 so as to apply tension in the width direction of the graphite heater 3.

Figure 7:
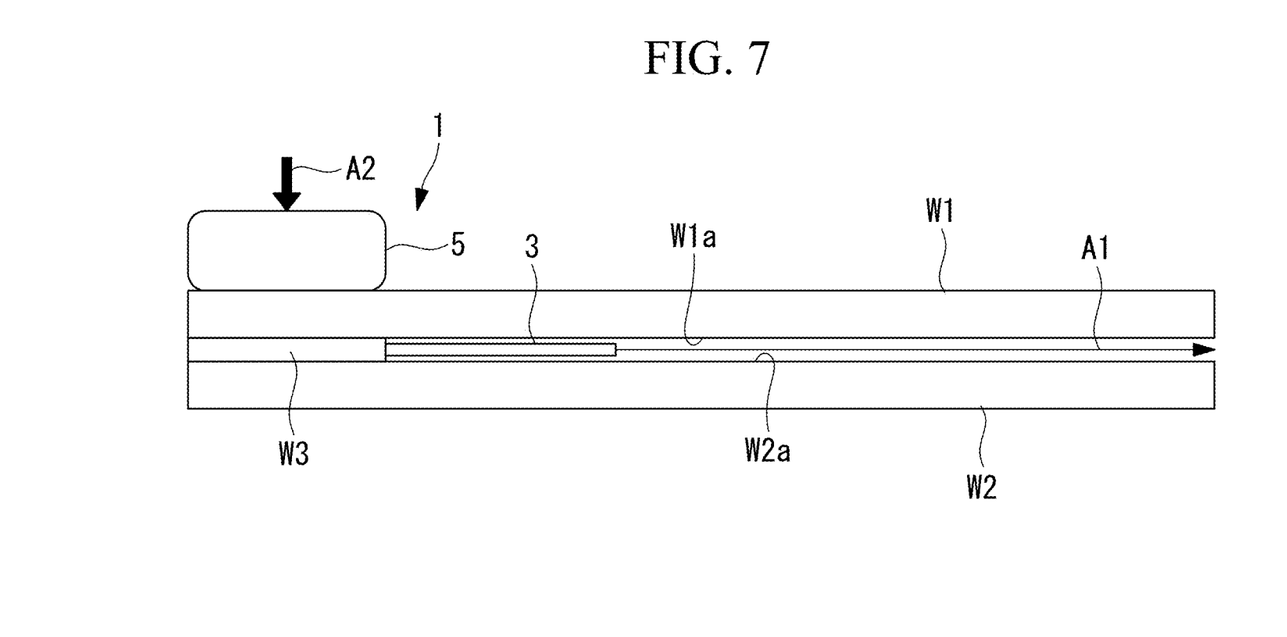
FIG. 7 is a side view illustrating a state where the graphite heater has been moved in a traveling direction from the state of FIG. 6.

Then, as illustrated in FIG. 7, the clamp devices 7 move the graphite heater 3 in the traveling direction A1 in accordance with an instruction from the control unit. Furthermore, the control unit pushes the pressure cooling plate 5 against the upper surface of the first composite material member W1 in the arrow A2 direction to press the bonding surfaces W1a and W2a while causing the pressure cooling plate 5 to follow the rear side of the graphite heater 3 in the traveling direction A1. At this time, the heat of the bonding surfaces W1a and W2a is absorbed in the pressure cooling plate 5 via the first composite material member W1, and thereby the bonding surfaces W1a and W2a are cooled. By performing pressure cooling on the heated-finished region with the pressure cooling plate 5 in such a way, a bonding portion W3 is formed between the first composite material member W1 and the second composite material member W2, and the first composite material member W1 and the second composite material member W2 are bonded to each other.

Figure 8:
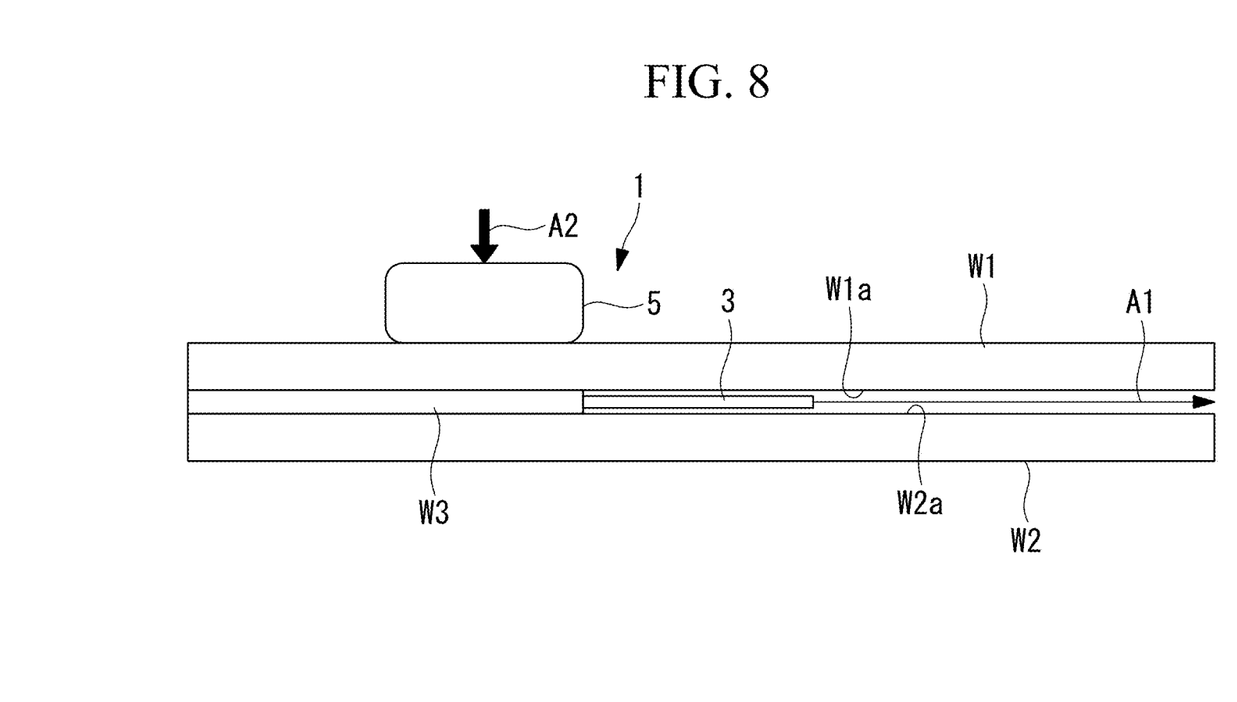
FIG. 8 is a side view illustrating a state where the graphite heater has been moved in the traveling direction from the state of FIG. 7.

The clamp devices 7 move the graphite heater 3 continuously in the traveling direction A1, the control unit causes the pressure cooling plate 5 to move continuously in the traveling direction A1, and thereby the first composite material member W1 and the second composite material member W2 are sequentially bonded to each other, as illustrated in FIG. 8.

The effects and advantages of the present embodiment described above are as follows.

The graphite heater 3 is arranged between and in contact with the first bonding surface W1a and the second bonding surface W2a, and the first bonding surface W1a and the second bonding surface W2a are heated and bonded. The graphite heater 3 can be moved in the traveling direction A1 by the clamp devices 7 serving as a graphite heater motion device. It is therefore possible to suitably evacuate the graphite heater 3 from the heated region and bond the first bonding surface W1a and the second bonding surface W2a to each other, which allows for a shorter cycle time for bonding the composite material members W1 and W2 to each other.

The graphite heater 3 is moved in the traveling direction A1 while the first bonding surface W1a and the second bonding surface W2a are being heated by the graphite heater 3 by using the clamp devices 7 operated in accordance with an instruction from the control unit. Accordingly, since it is possible to sequentially evacuate the graphite heater 3 from the heated region and bond the first bonding surface W1a and the second bonding surface W2a to each other, which allows for a shorter cycle time.

In the heated-finished region after heated by the graphite heater 3, the first bonding surface W1a and the second bonding surface W2a are pressed and cooled by using the pressure cooling plate 5. Accordingly, it is possible to perform bonding between the composite material members W1 and W2 quickly by pressing and cooling without delay after the heating.

The graphite heater 3 is moved in the traveling direction A1 while both the ends of the graphite heater 3 are held and tension is applied between both the ends of the graphite heater 3 by the clamp devices 7. Accordingly, the graphite heater 3 can be stably moved in the traveling direction A1.

The graphite heater 3 is used as a heater, and the structure having the heat generating portion 3a made of graphite and the insulating layers 3b interposing and securing the heat generating portion 3a is employed. With the heat generating portion 3a being made of graphite, a short heating time and a high attainable temperature can be realized. For example, the heat generating portion made of graphite can reach 1300° C. in a heating time of about 0.2 seconds.

Modified Example

The embodiment described above can be modified as follows.

Although the embodiment described above is configured to perform heating while continuously moving the graphite heater 3 in the traveling direction A1, some embodiments may be configured to temporarily stop the graphite heater 3 to heat the first bonding surface W1a and the second bonding surface W2a, then move the graphite heater 3 by a predetermined distance in the traveling direction A1 and again stop and heat the graphite heater 3, and repeat these steps.

Figure 9:
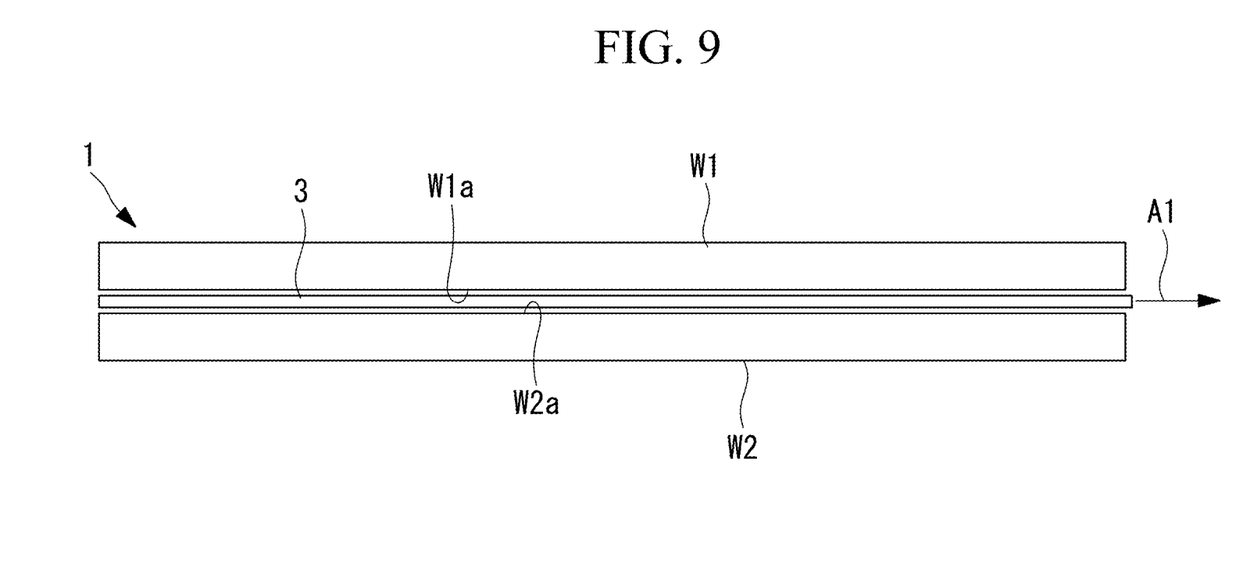
FIG. 9 is a side view illustrating a modified example of a graphite heater.

As illustrated in FIG. 9, the graphite heater 3 may be arranged over the entire region to be bonded, and the graphite heater 3 may be moved and evacuated in the traveling direction A1 after the entire region is heated at once. This can prevent the tip portion of the graphite heater 3 from being caught between the bonding surfaces W1a and W2a.

Although the embodiment described above is configured to hold both the ends of the graphite heater 3 by using the clamp devices 7, some embodiments may be configured to move the graphite heater 3 by supporting and pulling the tip thereof in the traveling direction A1 in addition to or instead of holding both the ends of the graphite heater 3.

Figure 10:
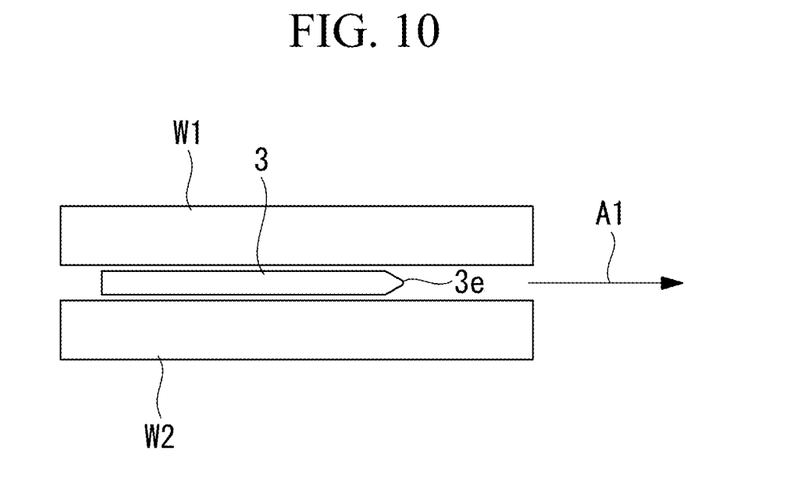
FIG. 10 is a side view illustrating a graphite heater provided with a tapered portion at the tip.

As illustrated in FIG. 10, a tapered portion 3e whose thickness decreases toward the front may be provided at the tip of the graphite heater 3 in the traveling direction A1. It is preferable that the tip of the tapered portion 3e have an R(radius) shape. This can reduce the resistance at the tip of the graphite heater 3 and thereby reduce the likelihood of being caught when the graphite heater 3 is moved in the traveling direction A1. Therefore, a smooth operation of the graphite heater 3 can be realized.

Figure 11:
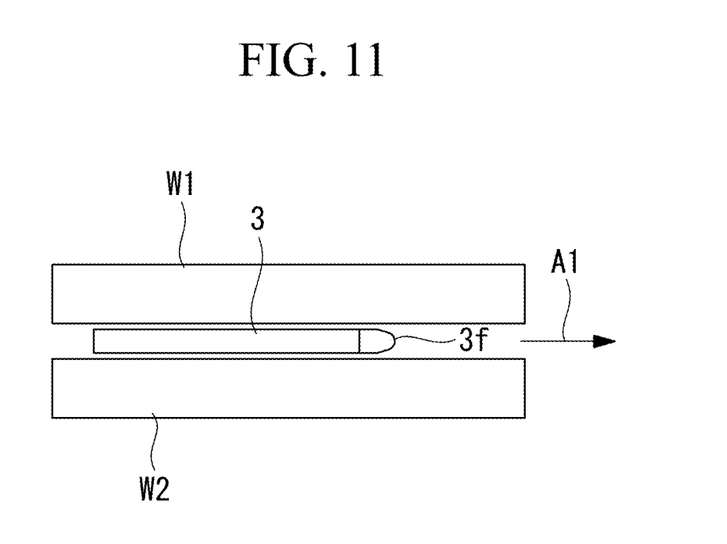
FIG. 11 is a side view illustrating a graphite heater provided with a tip reinforced portion.

As illustrated in FIG. 11, a tip reinforced portion 3f having a larger strength than another region of the graphite heater 3 may be provided at the tip in the traveling direction A1 of the graphite heater 3. This can suppress friction or damage of the tip of the graphite heater 3 when the graphite heater 3 is moved in the traveling direction A1. As the tip reinforced portion 3f, a cover portion that covers the tip of the graphite heater 3 with a rigid material such as a metal, for example, may be provided. As the tip reinforced portion 3f, a fiber reinforced portion that reinforces the material of the tip of the graphite heater 3 with reinforcement fibers such as glass fibers or carbon fibers may be provided. It is preferable that the tip reinforced portion 3f have the tapered shape as with the tapered portion 3e illustrated in FIG. 10.

The heating region of the graphite heater 3 may be divided into a plurality of heating regions, and control to differentiate temperatures on a heating region basis may be performed by the control unit. This enables a suitable temperature distribution to be set in accordance with the state between the bonding surfaces W1a and W2a such as the presence or absence of a gap between the bonding surfaces W1a and W2a, the level of the contact force between the bonding surfaces W1a and W2a, and the like. For example, when the graphite heater 3 is heated while being moved in the traveling direction A1 as described in the above embodiment, a temperature distribution may be set such that the temperature increases in order from the upstream to the downstream in the traveling direction A1 of the graphite heater 3. This enables the heating region to have sequential rise in temperature from a preheating temperature to a desired bonding temperature.

A temperature sensor may be provided to the graphite heater 3, and the control unit may control the heating amount of the graphite heater 3 based on a measured value of the temperature sensor. Accordingly, it is possible to control the heating amount of the graphite heater 3 based on the temperature sensor provided to the graphite heater 3 to realize a desired bonding temperature. Furthermore, it is possible to correct variation in heating due to the plate thickness of the composite material members W1 and W2, the gap between the bonding surfaces W1a and W2a, or the like. The temperature sensor may be provided to a single place of the graphite heater 3 or may be provided to a plurality of places.

Figure 12:
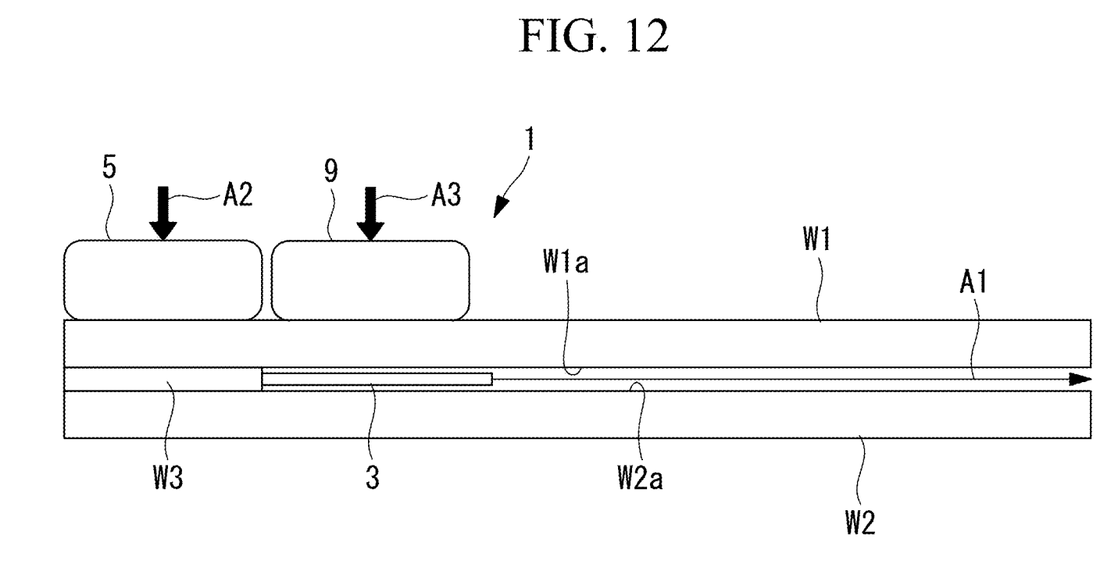
FIG. 12 is a side view illustrating a modified example of a composite material bonding apparatus provided with a heating-state pressing plate.

As illustrated in FIG. 12, a heating-state pressing plate (heating-state pressing device) 9 that pushes and presses the first bonding surface W1a and the second bonding surface W2a in the arrow A3 direction in a heated region that is being heated by the graphite heater 3 may be provided. The pressing force of the heating-state pressing plate 9 is controlled by the control unit. Accordingly, good thermal conductivity to the first bonding surface W1a and the second bonding surface W2a can be obtained. It is preferable that the pressing force be set to such a degree that the first bonding surface W1a and the second bonding surface W2a can be melted by the graphite heater 3 and that the graphite heater 3 can be smoothly moved in the traveling direction A1.

Although the graphite heater 3 is used as a sheet heater in the embodiment described above, a sheet heater having the heat generating portion made of high elastic modulus fibers such as pitch-based carbon fibers may be used instead of the graphite heater 3.

The composite material bonding apparatus and the composite material bonding method described in each of the above embodiments are understood as below, for example.

The composite material bonding apparatus according to one aspect of the present disclosure includes: a planar sheet heater; a sheet heater motion device that moves the sheet heater, which is arranged between a first bonding surface of a first composite material member and a second bonding surface of a second composite material member facing the first bonding surface, in a first direction with the sheet heater being in contact with the first bonding surface and the second bonding surface; and a control unit that controls the sheet heater to heat the first bonding surface and the second bonding surface while the sheet heater is in contact with the first bonding surface and the second bonding surface.

The sheet heater is arranged between and in contact with the first bonding surface and the second bonding surface, and the first bonding surface and the second bonding surface are heated and bonded to each other. The sheet heater can be moved in the first direction by the sheet heater motion device. It is therefore possible to suitably evacuate the sheet heater from the heated region and bond the first bonding surface and the second bonding surface, which allows for a shorter cycle time for bonding the composite material members to each other.

The first bonding surface and the second bonding surface may be heated while the sheet heater is continuously moved in the first direction. The sheet heater is temporarily stopped and heated, and the sheet heater is then moved by a predetermined distance in the first direction, stopped again, and heated. These steps may be sequentially repeated. The sheet heater may be arranged over the entire region to be bonded, and after the entire region is heated at once, the sheet heater may be moved and evacuated in the first direction.

In the composite material bonding apparatus according to one aspect of the present disclosure, the control unit causes the sheet heater to heat the first bonding surface and the second bonding surface while causing the sheet heater motion device to move the sheet heater in the first direction.

The sheet heater is moved in the first direction while the first bonding surface and the second bonding surface are heated by the sheet heater. Accordingly, since it is possible to sequentially evacuate the sheet heater from the heated region and bond the first bonding surface and the second bonding surface to each other, the cycle time can be shortened.

In the composite material bonding apparatus according to one aspect of the present disclosure, a pressure cooling device that presses and cools the first bonding surface and the second bonding surface in a heated-finished region obtained after the sheet heater is moved in the first direction by the sheet heater motion device is provided.

In the heated-finished region after heated by the sheet heater, the first bonding surface and the second bonding surface are pressed and cooled by the pressure cooling device. Accordingly, it is possible to perform bonding between the composite material members quickly by pressing and cooling without delay after the heating.

In the composite material bonding apparatus according to one aspect of the present disclosure, a heating-state pressing device that presses the first bonding surface and the second bonding surface in a heated region that is being heated by the sheet heater is provided, and the control unit controls pressing force of the heating-state pressing device.

Since the pressing force of the heating-state pressing device that presses the heated region can be controlled by the control unit, good thermal conductivity to the first bonding surface and the second bonding surface can be obtained. It is preferable that the pressing force be set to such a degree that the first bonding surface and the second bonding surface can be melted by the sheet heater and that the sheet heater can be moved in the first direction.

In the composite material bonding apparatus according to one aspect of the present disclosure, the control unit differentiates temperatures for respective heating regions of the sheet heater.

The temperature distribution is provided such that temperatures are differentiated for respective heating regions of the sheet heater by the control unit. This enables a suitable temperature distribution to be set in accordance with the state between the bonding surfaces such as the presence or absence of a gap between the bonding surfaces, the level of the contact force between the bonding surfaces, and the like.

When the sheet heater is heated while being moved in the first direction, a temperature distribution may be set such that the temperature increases in order from the upstream to the downstream in the first direction of the sheet heater, for example. This enables the heating region to have sequential rise in temperature from a preheating temperature to a desired bonding temperature.

In the composite material bonding apparatus according to one aspect of the present disclosure, the sheet heater includes a temperature sensor, and the control unit controls a heating amount of the sheet heater based on a measured value of the temperature sensor.

The control unit controls the heating amount of the sheet heater based on the temperature sensor provided to the sheet heater. Accordingly, it is possible not only to realize a desired bonding temperature but also to correct variation in heating due to the plate thickness of the composite material members, the gap between the bonding surfaces, or the like.

In the composite material bonding apparatus according to one aspect of the present disclosure, a tapered shape whose thickness decreases toward the front is provided at a tip in the first direction of the sheet heater.

Since the tapered shape whose thickness decreases toward the front is provided at the tip of the sheet heater in the first direction, this can reduce the resistance at the tip of the sheet heater and thereby reduce the likelihood of being caught when the sheet heater is moved in the first direction. Accordingly, a smooth operation of the sheet heater can be realized.

In the composite material bonding apparatus according to one aspect of the present disclosure, a tip reinforced portion having a higher strength than another region of the sheet heater is provided at a tip in the first direction of the sheet heater.

Since the tip reinforced portion is provided at the tip of the sheet heater, friction or damage of the tip of the sheet heater can be suppressed when the sheet heater is moved in the first direction.

As the tip reinforced portion, a cover portion that covers the tip of the sheet heater with a rigid material such as a metal is provided, for example. As the tip reinforced portion, a fiber reinforced portion that reinforces the material of the tip of the sheet heater with reinforcement fibers such as glass fibers or carbon fibers is provided.

In the composite material bonding apparatus according to one aspect of the present disclosure, the sheet heater motion device includes holding units that hold both ends in a second direction orthogonal to the first direction of the sheet heater, respectively, and the control unit controls the holding units to move the sheet heater in the first direction with tension being applied between both the ends of the sheet heater.

The sheet heater is moved in the first direction while both the ends of the sheet heater are held and tension is applied between both the ends of the sheet heater by the holding unit. Accordingly, the sheet heater can be stably moved in the first direction.

Furthermore, to stably move the sheet heater, the holding unit may be controlled to generate tension between both the ends of the sheet heater.

Note that the tip in the first direction of the sheet heater may be supported and moved in addition to or instead of holding both the ends.

In the composite material bonding apparatus according to one aspect of the present disclosure, in the sheet heater, a both-end reinforced portion having a higher strength than another region of the sheet heater is provided to a region held by the holding units.

Tension force will be applied to both the ends of the sheet heater by the holding unit. Accordingly, by reinforcing both the ends of the sheet heater, it is possible to suppress damage of the sheet heater as small as possible.

As the both-end reinforced portion, glass fibers can be used as a material having a high strength and low electric conductivity, for example.

In the composite material bonding apparatus according to one aspect of the present disclosure, the sheet heater includes a heat generating portion made of graphite and insulating layers interposing and securing the heat generating portion.

The sheet heater is formed of the graphite heater. That is, the sheet heater is structured to have the heat generating portion made of graphite and the insulating layers interposing and securing the heat generating portion. With the heat generating portion being made of graphite, a short heating time and a high attainable temperature can be achieved. For example, the heat generating portion made of graphite can reach 1300° C. in a heating time of about 0.2 seconds.

The composite material bonding method according to one aspect of the present disclosure is a composite material bonding method using a planar sheet heater and a sheet heater motion device that moves the sheet heater, which is arranged between a first bonding surface of a first composite material member and a second bonding surface of a second composite material member facing the first bonding surface, in a first direction with the sheet heater being in contact with the first bonding surface and the second bonding surface, and composite material bonding method includes causing the sheet heater to heat the first bonding surface and the second bonding surface while the sheet heater is in contact with the first bonding surface and the second bonding surface.

REFERENCE SIGNS LIST 1 composite material bonding apparatus
3 graphite heater (sheet heater)
3a heat generating portion
3b insulating layer
3c heat generating region
3d extension region
3e tapered portion
3f tip reinforced portion
5 pressure cooling plate (pressure cooling device)
7 clamp device (holding unit: sheet heater motion device)
9 heating-state pressing plate (heating-state pressing device)
A1 traveling direction (first direction)

D1 longitudinal direction
D2 width direction
W1 first composite material member
W1a first bonding surface
W2 second composite material member
W2a second bonding surface
W3 bonding portion

The invention claimed is:

1. A composite material bonding apparatus comprising:
a planar sheet heater;
a sheet heater motion device that moves the sheet heater, which is arranged between a first bonding surface of a first composite material member and a second bonding surface of a second composite material member facing the first bonding surface, in a first direction with the sheet heater being in contact with the first bonding surface and the second bonding surface; and
a control unit that controls the sheet heater to heat the first bonding surface and the second bonding surface while the sheet heater is in contact with the first bonding surface and the second bonding surface.

2. The composite material bonding apparatus according to claim 1, wherein the control unit causes the sheet heater to heat the first bonding surface and the second bonding surface while causing the sheet heater motion device to move the sheet heater in the first direction.

3. The composite material bonding apparatus according to claim 1, further comprising a pressure cooling device that presses and cools the first bonding surface and the second bonding surface in a heated-finished region obtained after the sheet heater is moved in the first direction by the sheet heater motion device.

4. The composite material bonding apparatus according to claim 1, further comprising a heating-state pressing device that presses the first bonding surface and the second bonding surface in a heated region that is being heated by the sheet heater,
wherein the control unit controls pressing force of the heating-state pressing device.

5. The composite material bonding apparatus according to claim 1, wherein the control unit differentiates temperatures for respective heating regions of the sheet heater.

6. The composite material bonding apparatus according to claim 1,
wherein the sheet heater comprises a temperature sensor, and
wherein the control unit controls a heating amount of the sheet heater based on a measured value of the temperature sensor.

7. The composite material bonding apparatus according to claim 1, wherein a tapered shape whose thickness decreases toward the front is provided at a tip in the first direction of the sheet heater.

8. The composite material bonding apparatus according to claim 1, wherein a tip reinforced portion having a higher strength than another region of the sheet heater is provided at a tip in the first direction of the sheet heater.

9. The composite material bonding apparatus according to claim 1,
wherein the sheet heater motion device comprises holding units that hold both ends in a second direction orthogonal to the first direction of the sheet heater, respectively, and
wherein the control unit controls the holding units to move the sheet heater in the first direction with tension being applied between both the ends of the sheet heater.

10. The composite material bonding apparatus according to claim 9, wherein in the sheet heater, a both-end reinforced portion having a higher strength than another region of the sheet heater is provided to a region held by the holding units.

11. The composite material bonding apparatus according to claim 1, wherein the sheet heater comprises a heat generating portion made of graphite and insulating layers interposing and securing the heat generating portion.

12. A composite material bonding method using
a planar sheet heater, and
a sheet heater motion device that moves the sheet heater, which is arranged between a first bonding surface of a first composite material member and a second bonding surface of a second composite material member facing the first bonding surface, in a first direction with the sheet heater being in contact with the first bonding surface and the second bonding surface,
the composite material bonding method comprising:
causing the sheet heater to heat the first bonding surface and the second bonding surface while the sheet heater is in contact with the first bonding surface and the second bonding surface.

* * * * *